US012292318B2

United States Patent
Hedegaard et al.

(10) Patent No.: US 12,292,318 B2
(45) Date of Patent: May 6, 2025

(54) FLUID CONSUMPTION METER AND METHOD FOR DETECTING SOUND IN A PIPING SYSTEM

(71) Applicant: Kamstrup A/S, Skanderborg (DK)

(72) Inventors: Anders Hedegaard, Skanderborg (DK); Sune Hoveroust Dupont, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

(21) Appl. No.: 17/562,572

(22) Filed: Dec. 27, 2021

(65) Prior Publication Data

US 2022/0205823 A1 Jun. 30, 2022

(30) Foreign Application Priority Data

Dec. 28, 2020 (EP) ..................................... 20217411

(51) Int. Cl.
*G01F 1/667* (2022.01)

(52) U.S. Cl.
CPC ................... *G01F 1/667* (2013.01)

(58) Field of Classification Search
CPC . G01F 1/66; G01F 1/667; G01F 1/666; G01F 1/20; G01F 1/662; G01F 1/72; G01F 15/022; E03B 7/071; E03B 7/072; G01M 3/02; G01M 3/26; G01M 3/28; G01M 3/2807; G01M 3/2815
See application file for complete search history.

(56) References Cited

U.S. PATENT DOCUMENTS

| 6,550,324 B1* | 4/2003 | Mayer | G01F 1/6986 73/204.14 |
| 2010/0045471 A1* | 2/2010 | Meyers | G05D 7/0617 340/605 |
| 2014/0154991 A1* | 6/2014 | Brown | G01F 1/667 455/42 |
| 2014/0366612 A1* | 12/2014 | Horne | G01F 1/66 73/40.5 A |
| 2015/0317499 A1* | 11/2015 | Slutsky | G06K 7/1096 250/208.1 |
| 2017/0254685 A1 | 9/2017 | Wilt et al. | |
| 2017/0307466 A1 | 10/2017 | Brennan et al. | |

(Continued)

FOREIGN PATENT DOCUMENTS

| CN | 102970051 A | 3/2013 |
| DE | 102014016213 A1 | 5/2016 |

(Continued)

OTHER PUBLICATIONS https://www.fcc.gov/sites/default/files/interference_with_radio_tv_and_telephone_signals.pdf (Year: 2020).*

*Primary Examiner* — Son T Le
*Assistant Examiner* — Brian Butler Geiss
(74) *Attorney, Agent, or Firm* — McGlew and Tuttle, P.C.

(57) ABSTRACT

A fluid consumption meter (2) is arranged to measure a flow rate of a fluid and has a control device (14) with a sound detection module (26) arranged to detect a sound in said fluid. The control device (14) is configured such that during activation of the sound detection module (26) at least one further module (20, 22, 24) of the consumption meter (2) not required for sound detection is in a deactivated state. A method is provided for detecting sound in a piping system.

21 Claims, 2 Drawing Sheets

(56) References Cited

U.S. PATENT DOCUMENTS

| | | |
|---|---|---|
| 2019/0078919 A1* | 3/2019 | Niwa ................. G01F 1/667 |
| 2020/0256712 A1 | 8/2020 | Huck et al. |
| 2022/0205826 A1* | 6/2022 | Drachmann ........... G01F 25/20 |

FOREIGN PATENT DOCUMENTS

| | | |
|---|---|---|
| DE | 102014119512 A1 | 6/2016 |
| DE | 102017011201 A1 | 6/2019 |
| EP | 3112820 A1 | 1/2017 |
| JP | 2002039814 A | 2/2002 |
| JP | 2004108809 A | 4/2004 |
| WO | 2011058561 A2 | 5/2011 |
| WO | 2017005687 A1 | 1/2017 |

* cited by examiner

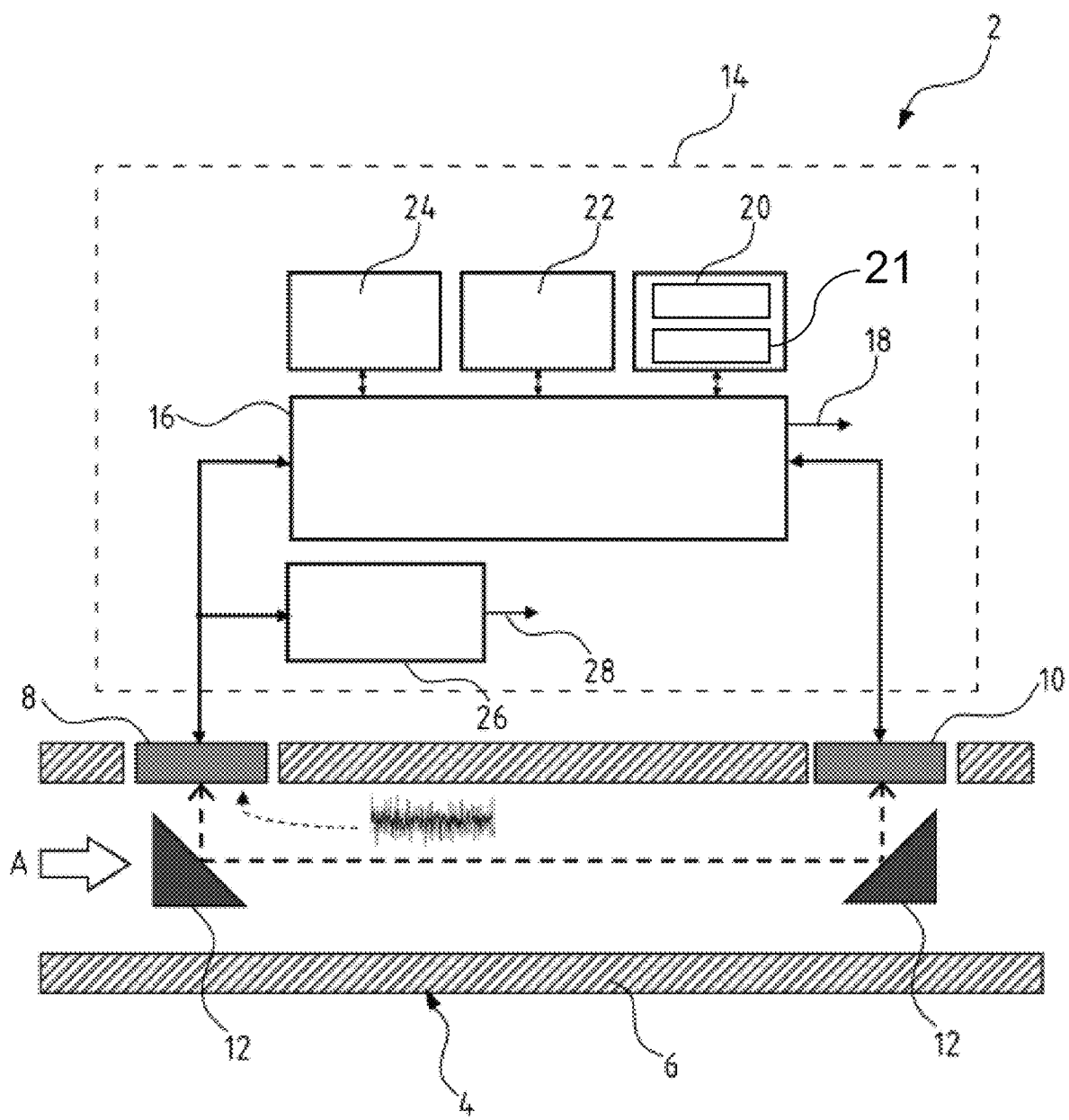

FLUID CONSUMPTION METER AND METHOD FOR DETECTING SOUND IN A PIPING SYSTEM

CROSS REFERENCE TO RELATED APPLICATIONS

This application claims the benefit of priority under 35 U.S.C. § 119 of European Application 20217411.6, filed Dec. 28, 2020, the entire contents of which are incorporated herein by reference.

TECHNICAL FIELD

The present invention pertains to detecting fluid consumption, in particular water consumption and to a fluid consumption meter arranged to measure a flow rate of a fluid and comprising a control device with a sound detection module arranged to detect a sound in the fluid. A method for detecting sound in a piping system by use of the fluid consumption meter is also provided.

TECHNICAL BACKGROUND

For detecting fluid consumption, in particular water consumption, ultrasonic consumption meters are known in the prior art. Furthermore, it is known to detect pipe leakages by detecting acoustic noise inside the pipes. WO 2017/005687 A1 discloses to provide an additional microphone inside a fluid consumption meter or to use the ultrasonic transducers which are provided for flow measurement to additionally detect acoustic noise inside a piping system connected to the fluid consumption meter.

SUMMARY

It is an object of the present invention to provide a fluid consumption meter and a method for detecting sound in a piping system providing enhanced sound detection properties.

This object is achieved by a fluid consumption meter having the features according to the invention and by a method having the features according to the invention. Preferred embodiments are disclosed in the following description and the accompanying drawings.

The fluid consumption meter according to the invention is arranged or configured to measure a flow rate of a fluid and to determine the fluid consumption over time on basis of the detected flow rate. In view of this the fluid consumption meter may correspond to known fluid consumption meters. The fluid consumption meter comprises a control device, which may be a control device carrying out the flow measurement and calculation of the consumption on basis of this flow measurement. The control device comprises a sound detection module which is arranged to detect a sound in said fluid contained inside the fluid consumption meter and inside a piping connected to the fluid consumption meter, which piping is containing said fluid, too. The fluid detection module may comprise or be connected to at least one suitable transducer or sensor for detecting sound or acoustic noise in the fluid. The sound detection module furthermore may comprise electronic components and/or software applications for evaluation of sound signals received from the mentioned transducers to carry out the sound detection.

According to the invention the control device is configured such that during activation of the sound detection module at least one further module of the consumption meter, i.e. at least one further electronic module of the consumption meter, which further module is not used during the sound detection, is in a deactivated state. This at least one deactivated further module in particular may be an electronic module producing disturbances which may have a negative impact on the sound detection. The disturbances for example may be acoustic, electric and/or electromagnetic noise which may affect the sound detection. This means, the further module not needed for sound detection is switched off during the sound detection or not switched on during the sound detection such that it is kept in a deactivated or inactive state. An inactive or deactivated state according to the invention means that the module is fully inactivated or just set into a sleeping mode, for example powered by only a low current, to keep the module or circuit alive on a reduced or minimum level, but without any functional activities enabled in the circuit or module. By this, a disturbance occurring from the operation of this further module can be avoided or reduced and thus the sound detection properties of the consumption meter can be improved. The signal/noise ratio can be improved. In particular, oscillations and interfering frequencies caused by a certain module in the fluid consumption meter can be eliminated by the deactivation of the respective module during the sound detection or sound measurement.

The at least one further module which is not required for the sound detection and may be set or hold in a deactivated state, i.e. being deactivated or kept deactivated during sound detection, may preferably be a display of the consumption meter, and/or a clock inside the consumption meter and/or a communication module. These for example are modules which may cause interfering signals or frequencies disturbing or impede a proper sound detection.

According to a further preferred embodiment the module to be deactivated or to be in a deactivated state during sound detection may be a wireless transmission module, i.e. a communication module for wireless or radio communication. This wireless transmission module may be the only wireless transmission module of the fluid consumption meter, such that the wireless communication is completely deactivated during the sound measurement. According to a further possible embodiment the wireless transmission module may be a module using a certain frequency range for transmission or communication, such that only the use of this frequency range is deactivated and a communication using a different frequency range may be continued. For example, a special frequency range used for communication and control of the sound detection may be kept activated during the sound detection, wherein other communication modules or frequency ranges are deactivated or not used during the sound detection. In particular, those communication modules or wireless transmission modules causing disturbances or interfering signals which may influence the sound or acoustic noise detection may be deactivated.

The sound detection preferably is a sound detection in the audible range, preferably in a range of 500 Hz to ten kHz, further preferred in a range of 500 Hz to two kHz.

According to a further possible embodiment the further module being in a deactivated state during sound detection may be a program clock and/or a high frequency clock inside the fluid consumption meter. The high frequency clock is for example used when calculations have to be made or when wireless communication is ongoing. Such a clock may provide disturbances influencing a sound detection. In particular, this may be a clock which is allowed to be switched off without any further impact on the operation of the fluid consumption meter. Preferably the fluid consumption meter comprises an additional real-time clock which is in continuous operation, i.e. not deactivated so that the real-time, which is required for consumption measurement, is still continuously available in the consumption meter.

According to a further preferred embodiment of the invention said at least one further module is a module having at least one electronic component which is placed next or neighboring to electronic components of said sound detection module. In particular, this electronic component may be placed in immediate vicinity without any further component between. Such components being in direct neighborhood to the components used for the sound detection may have a strong disturbing influence on the sound detection. Therefore, it may be preferred that those electronic components are in a deactivated state. For example, those components may be inductors or capacitors.

According to a further possible embodiment of the invention said at least one further module, which is in a deactivated state during sound detection, is a module having at least one electronic component arranged on the same circuit board together with electronic components or at least one electronic component of the sound detection module, i.e. together with an electronic component used for the sound detection. The arrangement of electronic components on the same circuit board may cause disturbances, therefore, it may be advantageous to have a possible disturbing component on the same circuit board in a deactivated state, i.e. not in use, during the sound detection. By this the sound detection properties can be improved.

According to a preferred embodiment the fluid consumption meter comprises an ultrasonic flow measurement device. Such an ultrasonic flow measurement device, preferably, comprises at least one ultrasonic transducer, further preferred two ultrasonic transducers for flow measurement in the fluid. This, for example, may be a fluid consumption meter as known from WO 2017/005687 A1. Preferably, at least one ultrasonic transducer of the ultrasonic flow measurement device is connected to the sound detection module such that the at least one ultrasonic transducer is used for listening to sound in the fluid. Accordingly, said at least one ultrasonic transducer has a dual function, for flow measurement and for sound detection inside the fluid. In case that the ultrasonic flow measurement device comprises more than one ultrasonic transducer, it may be possible to additionally use more than one or all of these ultrasonic transducers for sound or acoustic noise detection inside the fluid.

According to a further possible embodiment the sound detection module may comprise a sound sensor, preferably a microphone for detecting sound in said fluid. Such sound sensor may be used as an alternative to the use of an ultrasonic transducer or in addition to the use of the ultrasonic transducer as described before. Furthermore, there may be provided more than one sound sensor or microphone for detecting acoustic noise or sound inside the fluid. Thus, the sound detection module may comprise one or more dedicated sound sensors for sound detection used as separate sensor, i.e. separate from the flow measurement device. However, it would also be possible to use one or more dedicated sound sensor in combination with ultra-sonic transducers used for sound detection.

According to a further possible embodiment said control device is configured such that the sound detection module is activated only if a measured flow is below a predetermined limit, preferably if the flow is zero. By this, disturbing noise occurring from the fluid flow can be avoided and the listening to sound in a connected pipe system can be enhanced. According to a further possible solution the control device may be configured such that a flow measurement device is deactivated or is in a deactivated state during the sound detection. By this a disturbing influence of the flow measurement device can be eliminated. Furthermore, this is of advantage in case that ultrasonic transducers of the flow measurement device have a dual function, i.e. are in addition used for sound detection. Thus, preferably the acoustic sound detection is carried out if there is a flow below the predefined limit or no flow through the fluid consumption meter and if the at least one further module, preferably electronic circuits placed close to electronic circuits of the sound detection module are not in operation, i.e. in a deactivated state. By this combination interfering noise and disturbances can be suppressed in a more effective manner and the sound detection can be improved, for example to enable a more precise leak detection as explained below. Whether the flow is below the predetermined limit may for example be detected by a flow measurement device inside the flow meter. Furthermore, in addition or as an alternative the sound detection may be carried out during time periods, for example day times in which usually no flow occurs, for example during nighttime.

The control device may be configured such that said at least one further module of the consumption meter, which module is not required for sound detection, is deactivated prior to starting a sound detection, preferably at least fifteen milliseconds, further preferably at least 0.25 seconds or more than one second before the start of the sound detection. By this a secure deactivation of the at least one module prior to start of the sound detection can be ensured. Furthermore, disturbing frequencies or vibrations are subsided before the sound detection is carried out.

According to a preferred embodiment said sound detection module is configured to detect noise or sound representing or occurring from a leakage in a piping system which is connected to said fluid consumption meter. This may in particular be a noise transmitted via a fluid contained inside the fluid consumption meter when being in use. Thus, the sound detection module may be part of a leakage detection module inside the fluid consumption meter. Such leakage detection module, preferably including said sound detection module, may be realized as a software and/or hardware module inside the fluid consumption meter, in particular as a part of the control device of said fluid consumption meter. For leakage detection the fluid consumption meter may communicate with at least one further fluid consumption meter and/or external control device or remote control. For this a communication module inside the fluid consumption meter may be used. According to a preferred embodiment such communication is suppressed or deactivated during the sound detection such that no disturbing acoustic or electromagnetic noise or oscillation is caused by such communication module during the sound detection used for leakage detection.

Beside the described fluid consumption meter a method for detecting sound is subject of the present invention. Preferred embodiments or aspects described in relation with the fluid consumption meter in the foregoing should be regarded as preferred embodiments of the method, too. Furthermore, preferred embodiments of the method should be regarded as preferred implementations of the fluid consumption meter, in particular the control device of such fluid consumption meter.

The method according to the invention is used to detect sound in a piping system which is connected to a fluid consumption meter. For the sound detection, i.e. listening into the pipe system said fluid consumption meter is used, preferably a fluid consumption meter as described in the foregoing. The fluid consumption meter comprises sound detection means or a sound detection module. According to the method during the sound detection procedure at least one further module, in particular an electronic module of the fluid consumption meter, which module is not required for the sound detection, is in a deactivated state. The further module may be deactivated prior to start of the sound detection or in case that the further module was not activated before, it is ensured that the module is kept deactivated during the sound detection. The further module may be an electronic module or a module having electronic components which are arranged in the neighboring to electronic components used for the sound detection. By deactivating the not required components, in particular components producing disturbing noise or oscillations, the sound detection can be improved. The further module may for example be a display, a clock, in particular a high frequency clock, and/or a wireless communication module of the fluid consumption meter. Preferably, at least one of such modules may be set or kept in a deactivated state prior or during the sound detection to reduce disturbing noise and/or frequencies which may have an impact on the sound detection.

Preferably said at least one further module is inactivated prior to starting the sound detection, preferably at least fifteen milliseconds before the start of the sound detection, further preferred at least 0.25 seconds or more than one second before the start of the sound detection. By this an influence of the sound detection occurring from said module can certainly be prevented.

According to a preferred embodiment of the method at least one ultrasonic transducer of a flow detection device of the fluid consumption meter and/or at least one sound sensor, in particular at least one dedicated sound sensor is used. Such a sound sensor preferably may be a microphone. A sound sensor can be used in addition to the ultrasonic transducer or alone. The ultrasonic transducer preferably is used for flow detection or measurement in the fluid consumption meter. Thus, in case that the ultrasonic transducer is used for sound detection, too, this is a dual use of the respective transducer. Since such ultrasonic transducers are optimized for flow measurement and not for sound detection, the sensitivity for audible sound to be detected may not the same as with a dedicated sound sensor. Thus, a high electronic amplification may be necessary to receive a suitable sound signal from such an ultrasonic transducer. Therefore, the use of such an ultrasonic transducer is very sensitive to disturbing noise. Thus, the fluid consumption meter as described above and the method according to the invention are of particular advantage for such a use of an ultrasonic sensor for sound detection, i.e. detection of sound in the audible range. The ultrasonic sensor is optimized for a different resonance frequency than to be detected during sound detection.

According to a preferred embodiment a prioritization between the several modules or the functionality of the modules is made and the modules or their functionality are deactivated or kept deactivated in the order of their priority. For example, modules having a higher priority may be kept activated and modules having a lower priority are deactivated or kept in a deactivated state. For example, the communication module may have a high priority and in case that communication is required during sound detection, this module is kept activated or switched into an activated state if required. However, further modules having a lower priority and not required at the moment may be set or kept in the deactivated state. This means that during sound detection, preferably only those further modules which are not required, i.e. having a lower priority, are deactivated or kept in a deactivated state. In the fluid consumption meter as described above, the control device may be configured such that the aforementioned prioritization can be established, i.e. that only those modules are deactivated or kept in a deactivated state which are not required during the sound detection.

In the following the invention is described by way of example with reference to the accompanying figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic view showing the essential components of the flow consumption meter according to FIG. 1.

DESCRIPTION OF PREFERRED EMBODIMENTS

Figure 1:
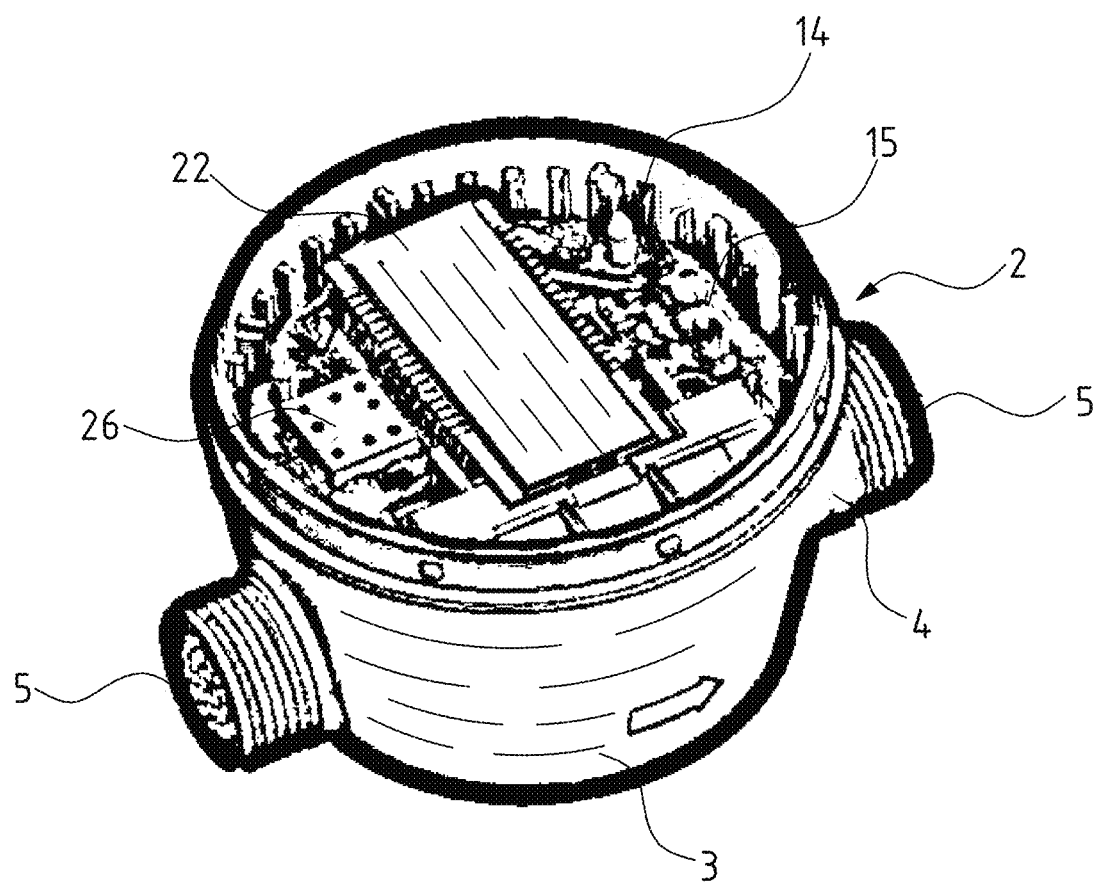
FIG. 1 is a perspective view showing a fluid consumption meter according to the invention, partly opened.

Referring to the drawings, the fluid consumption meter 2 as shown can be used to measure or record the fluid consumption, for example in a building. The fluid consumption meter 2 comprises a pipe section 4 to be placed in an inlet pipe of a building such that the fluid consumption meter 2 can detect the entire flow and calculate the fluid consumption of the entire building. For this, the piping section 4 may comprise flanges 5 for connection on both opposing ends. All components of the fluid consumption meter 2 are arranged in a housing 3, in this example integrally formed with the piping section 4. Inside the housing 3, integrated into the wall 6 of the piping section 4 there are arranged two ultrasonic transducers 8 and 10. In known manner, the ultrasonic transducers 8 and 10 are used for flow measurement inside the pipe section 4. The ultrasonic transducers 8 and 10 send an ultrasonic signal into the fluid flowing along direction A through the pipe section 4 and receive a reflected signal from the fluid. As known from prior art fluid consumption meters, there are arranged two reflectors 12 inside the pipe section 4. In the shown embodiment the two ultrasonic transducers 8 and 10 are integrated into the wall 6. However, it would be possible to arrange the ultrasonic transducers 8 and 10 outside the pipe sections 4, i.e. on the outer side of an unbroken, completely closed wall 6. Furthermore, it would also be possible to arrange the ultrasonic transducers or at least one of the ultrasonic transducers inside the pipe section 4.

The fluid consumption meter 2 comprises a control device 14 comprising all necessary hardware and software components for flow measurement and calculation of the fluid consumption, in this example arranged on a circuit board 15. At this point, only the components or modules essential for the present invention are described in detail. The ultrasonic transducers 8 and 10 are connected to the control device 14. The control device 14 comprises a flow measurement module or a flow measurement subcircuit 16, respectively. The ultrasonic transducers 8 and 10 are connected to this flow measurement module such that the flow measurement module 16 receives signals output from the ultrasonic transducers 8 and 10 and can output signals toward these transducers 8 and 10. The ultrasonic transducers 8 and 10 together with the flow measurement module 16 can be regarded as a flow measurement device. The flow measurement module 16 outputs a flow rate 18. The flow measurement module 16 may be a software module integrated into the control device 14 or consisting of a combination of special hardware and software. In this example the control device 14 further comprises a clock 20, a display 22 and a wireless transmission module 24. The wireless transmission module 24 may be provided for radio communication according to any suitable standard. The display 22 may be visible from the outer side of a housing 3 of the fluid consumption meter 2 to visualize measurement results, operating conditions etc. The clock in particular may be a high frequency clock, i.e. preferably a program clock. The control device 14 may comprise an additional low frequency clock, preferably a real-time clock 21.

The fluid consumption meter 2 further comprises a sound detection module 26 which in this example is connected to the first ultrasonic transducer 8. Thus, the ultrasonic transducer 8 in this example has a dual function, additionally to the flow measurement it is used for sound detection in the fluid. The sound detection preferably refers to the detection of acoustic sound or acoustic noise, in particular in the audible range. The sound detection module 26 may be part of a leakage detection module used to listen into the fluid or pipe section 4 to detect leakages in a piping system connected to the pipe section 4. Such sound detection module 26 and/or a leakage detection module may be realized as a software module or in form of a combination of special hardware and software inside the control device 14. The sound detection module 26 may output a noise level 28. The outputs of the flow measurement module 16 and the sound detection module 26 may for example be transmitted to the outside via the transmission module 24.

When using an ultrasonic transducer 8 for detecting sound inside the fluid in the piping section 4 there is a problem that the ultrasonic transducer 8 is optimized for sending and receiving ultrasonic signals, i.e. has a high resonance frequency which is needed for the flow measurement. This high resonance frequency is a frequency outside the frequency range to be detected during sound detection. Thus, it is required to highly amplify the signal of the ultrasonic transducer 8 during sound measurement or sound detection by said sound detection module 26. A respective amplifier preferably is included in the sound detection module 26. This makes a sound measurement susceptible to interferences or disturbances, for example due to noise or oscillations produced by other electronic components inside the control device 14. To avoid such disturbances or to eliminate such disturbances, according to the invention the control device 14 is configured such that it can switch off or keep switched off those modules or components inside the control device 14, which are not needed during sound detection and which may have an interfering influence on the sound detection. These are, for example, modules having electronic components which are arranged close to those electronic components which are used for sound detection, for example neighboring electronic components, in particular electronic components arranged on the same circuit board 15. As shown in FIG. 1 the display 22 and the sound detection module 26 are arranged on the same circuit board 15. In this example, these modules which are set into a deactivated or inactive state during sound measurement are the transmission module 24, the display 22 and/or the clock 20. These modules may either be switched off prior to starting the sound detection or in case they are already inactive, an activation of those modules is prohibited or prevented by the control device 14. For example, the display 22 is updated with a frequency of 32 Hz and, therefore, generates 32 small current draws per second. Each current draw comes with a flank rising edge and a flank falling edge and this train of current pulses would interfere with the sound detection, if the display would be active during the sound detection. Furthermore, preferably also the flow measurement module 16 is in a deactivated state during the sound detection. Preferably, sound detection and flow measurement are not carried out at the same time. In particular, the sound detection preferably is carried out in a period in which the flow inside the pipe section 4 is zero or at least below a predefined limit. This may be detected by the flow measurement module or the control device 14 may start the sound detection during time periods in which usually no flow occurs, for example during nighttime. Furthermore, it may be possible that the sound detection is activated from the outside via the transmission module 24 and the flow inside the piping system is stopped by an external device, for example by closing a valve. In case that the activation of sound detection is done from the outside, for example after receiving a respective signal, the control device 14 may switch off the transmission module 24, carry out the flow detection and later switch on the transmission module 24 again to output the measurement or detection result.

In this case the ultrasonic transducers 8 and 10 are used for sound detection. It may also be possible to have a separate sound sensor like a microphone for sound measurement in the piping section 4.

While specific embodiments of the invention have been shown and described in detail to illustrate the application of the principles of the invention, it will be understood that the invention may be embodied otherwise without departing from such principles.

LIST OF REFERENCE CHARACTERS 2 fluid consumption meter
3 housing
4 pipe section
5 flanges
6 wall
8, 10 ultrasonic transducers
12 reflectors
14 control device
15 circuit board
16 flow measurement module
18 flow rate
20 clock
22 display
24 transmission module
26 sound detection module
28 noise or sound level
A flow direction

What is claimed is:

1. A fluid consumption meter arranged to measure a flow rate of a fluid, the fluid consumption meter comprising a control device, the control device comprising:
   a sound detection module arranged to detect a sound in the fluid, the sound detection module being configured to detect a leakage in a connected piping system; and
   at least one further module of the consumption meter not required for sound detection, wherein the control device is configured to improve leak detection by the sound detection module such that said at least one further module is deactivated depending on a starting of sound detection, and during activation of the sound detection module the least one further module is in a deactivated state to avoid or reduce a disturbance occurring from the operation of the at least one further module.

2. The fluid consumption meter according to claim 1, wherein the at least one further module comprises one or more of a display, a clock and a communication module.

3. The fluid consumption meter according to claim 1, wherein the at least one further module is a wireless transmission module.

4. The fluid consumption meter according to claim 1, further comprising a real time clock in continuous operation wherein the at least one further module is a high frequency clock.

5. The fluid consumption meter according to claim 1, wherein the at least one further module comprises at least one electronic component positioned adjacent to electronic components of said sound detection module.

6. The fluid consumption meter according to claim 1, wherein the at least one further module comprises at least one electronic component arranged on a circuit board together with electronic components of the sound detection module.

7. The fluid consumption meter according to claim 1, wherein the fluid consumption meter comprises an ultrasonic flow measurement device.

8. The fluid consumption meter according to claim 7, further comprising at least one ultrasonic transducer of the ultrasonic flow measurement device, wherein the at least one ultrasonic transducer is connected to the sound detection module such that the at least one ultrasonic transducer is used to listen to sound in the fluid.

9. The fluid consumption meter according to claim 1, wherein the sound detection module comprises a sound sensor for detecting sound in the fluid.

10. The fluid consumption meter according to claim 1, wherein the control device is configured such that the sound detection module is activated only if a measured flow is below a predetermined limit.

11. The fluid consumption meter according to claim 1, wherein that the control device is configured such that the at least one further module of the fluid consumption meter not required for sound detection is deactivated at a time prior to starting a sound detection.

12. The fluid consumption meter according to claim 1, wherein the at least one further module is an electronic module producing disturbances which would have a negative impact on the sound detection.

13. The fluid consumption meter according to claim 1, wherein:
the control device is configured to reactivate the at least one further module depending on an ending of the sound detection.

14. A method for detecting sound in a piping system by use of a fluid consumption meter arranged to measure a flow rate of a fluid, the fluid consumption meter comprising a control device, the control device comprising: a sound detection module arranged to detect a sound in the fluid during a sound detection procedure, the sound detection module being configured to detect a leakage in a connected piping system; and at least one further module of the consumption meter not required for sound detection, the method comprising the steps of:

activating with the control device, the sound detection module during a sound detection procedure; and
with the control device improving leak detection by the sound detection module by deactivating the at least one further module of the fluid consumption meter not required for sound detection depending on a starting of sound detection, and during activation of the sound detection module the least one further module is in a deactivated state to avoid or reduce a disturbance occurring from the operation of the at least one further module.

15. The method according to claim 14, wherein the at least one further module comprises one or more of a display, a clock and a wireless communication module of the fluid consumption meter that are in a deactivated state during sound detection; and
the at least one further module is inactivated prior to starting the sound detection.

16. The method according to claim 14, wherein for sound detection at least one ultrasonic transducer of a flow detection device of the fluid consumption meter and/or a sound sensor is used.

17. The method according to claim 14, wherein a prioritization between several further modules is made and that the modules are deactivated or kept deactivated in the order of their priority.

18. The method according to claim 14, wherein the at least one further module, which is in a deactivated state during the sound detection procedure, comprises an electronic module producing disturbances which may have a negative impact on the sound detection.

19. The method according to claim 14, further comprising:
the control device reactivating the at least one further module depending on an ending of the sound detection.

20. A fluid consumption meter for measure a flow rate of a fluid, the meter comprising:
a sound detection module configured to detect a sound in the fluid, said sound detection module being selectively activated and deactivated, said sound detection module being configured to detect a leakage in a connected piping system;
a plurality of further modules, one of said plurality of further modules creating a disturbance to said sound detection module, said one further module being selectively activated and deactivated, said one further module being not required for sound detection when deactivated, said sound detection module not being required when said one further module is required to be activated for operation of the fluid consumption meter;
a control device configured to selectively activate and deactivate said one further module depending on the activation and deactivation of said sound detection module, said control device selectively activating and deactivating said sound detection module.

21. The fluid consumption meter according to claim 20, wherein:
deactivation of the one of further module reduces an ability of the fluid consumption meter to measure flow, the control device activates the sound detection module and deactivates the one further module when a flow is below a predetermined level, said control device activates the one further module and deactivate the sound detection module when the flow is above the predetermined level.

* * * * *